Figures 3, 4:
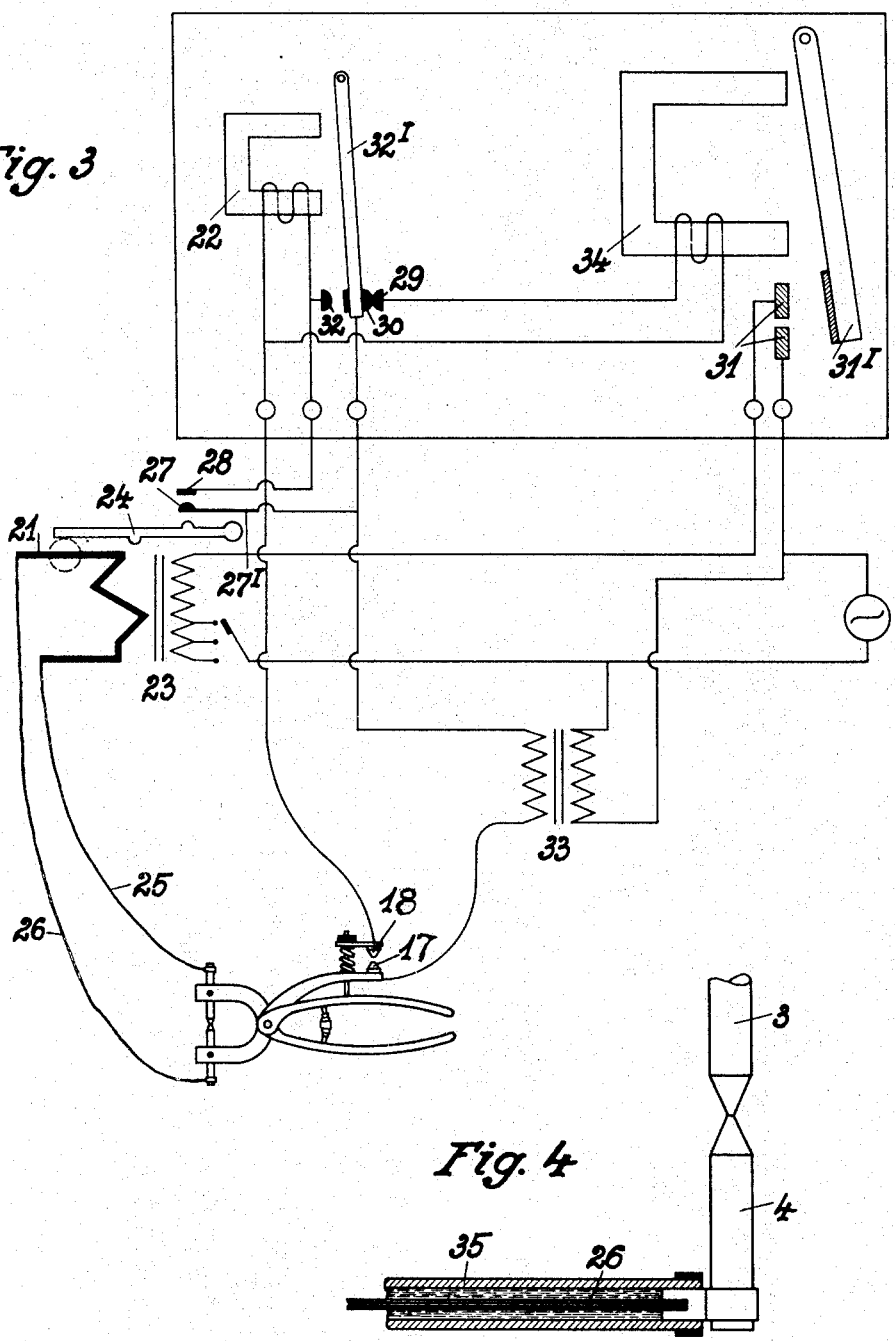

Dec. 19, 1939. W. GLADITZ 2,183,908
WELDING DEVICE
Filed March 6, 1937 2 Sheets-Sheet 1
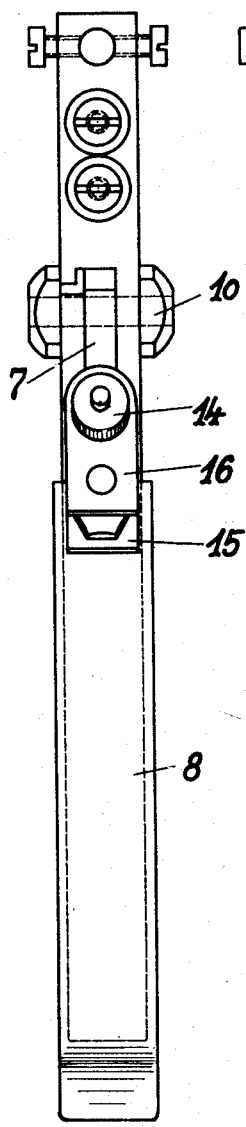
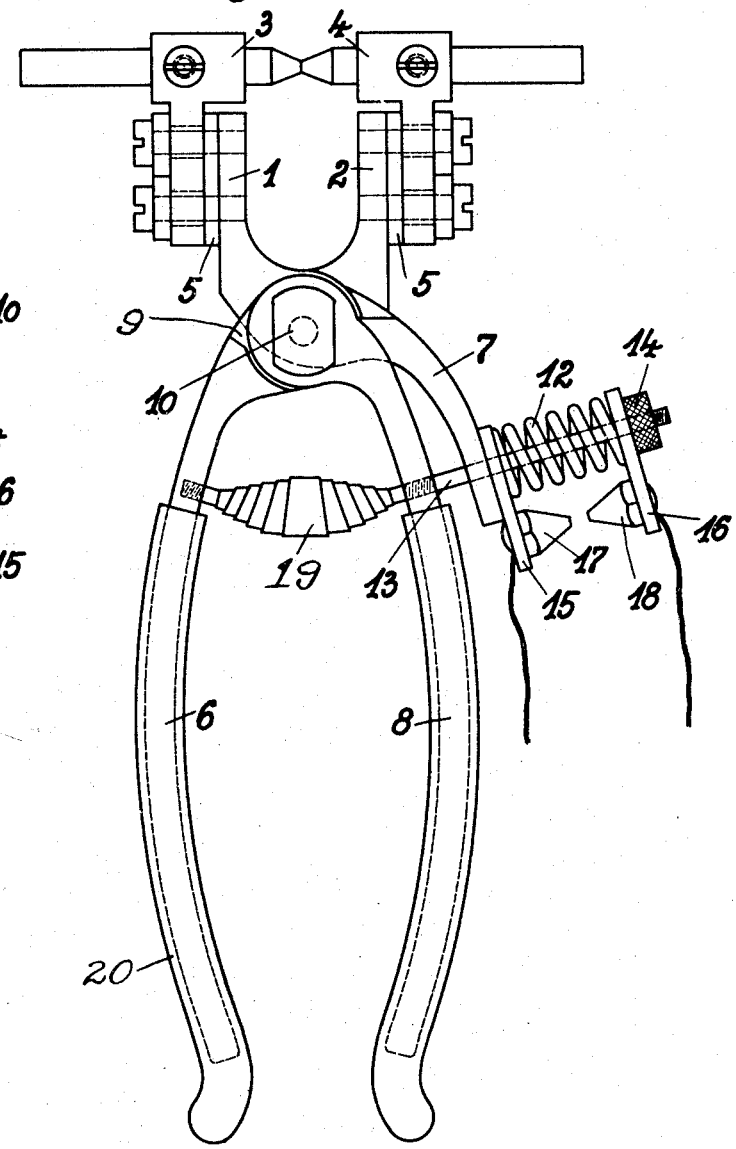
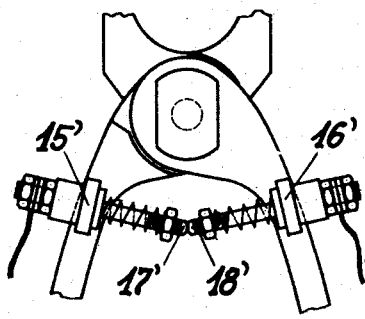
Inventor:
Walter Gladitz, Patented Dec. 19, 1939

2,183,908

UNITED STATES PATENT OFFICE 2,183,908

WELDING DEVICE

Walter Gladitz, Augsburg, Germany

Application March 6, 1937, Serial No. 129,304
In Germany March 6, 1936

2 Claims. (Cl. 219—4)

My invention relates to the art of welding, known as resistance welding, for uniting metal parts.

With the present welding apparatuses frequently a welding operation can not be carried out because of the undue size and the great weight of the welding apparatus, which makes it impossible to get to the welding place. Also such heavy welding apparatuses are difficult to manipulate, making it necessary to take the parts to be welded to the welding apparatus, which, however, in many cases can not be done because of the size and the weight of the parts to be welded.

The present invention more particularly relates to spot welding and one of the objects of this invention is to produce a welding tool which, because of its convenient shape and its small weight, enables it to be readily connected to a flexible cable, to be easily manipulated and to be used in welding places difficult of access.

A further object of this invention is to so design the welding tool that the welding operation only commences, when the electrodes rest on the work with a predetermined pressure.

Another object of the present invention is to provide a welding tool in which the electrodes are automatically disconnected when the desired amount of welding has been effected, that is to say, when a predetermined strength of current has been established.

In the appended drawings, on which I have shown, by way of illustration, an embodiment of my invention, Fig. 1 is a side elevation of the welding tool and Fig. 2 a front view thereof; Fig. 3 shows the tool together with the switch mechanism and the circuit diagram, while Fig. 4 shows a detail; Fig. 5 shows a modification.

As shown on the drawings and more particularly in Fig. 2, the welding tool is made in the shape of a pair of tongs provided with the two jaws shown at 1 and 2. At 3 and 4 are shown the electrode carriers, made for example of copper, which are mounted on the jaws, being insulated therefrom by suitable bearing elements 5.

At 6 is shown a long handle which is made integral with the jaw 2, whereas at 7 is shown a short handle, hereinafter called the pressure handle, which is made integral with the jaw 1. At 8 is shown a separate third handle, similar to handle 6; the three handles 6, 7 and 8 are held together by a single pivot pin 10. At 9 is shown a recess in handle 6 to receive the pivotal end of the separate handle 8.

Into the latter there is screwed a stud shown at 13, which extends through a corresponding hole in the short pressure handle 7 and at its free end carries a nut 14. Intermediate the latter and the pressure handle 7 is provided a helical compression spring shown at 12, which encircles the stud 13. This compression spring, however, does not bear with its ends directly against the pressure handle 7 and the nut 14, but against interposed plates shown at 15 and 16, which carry the contacts 17 and 18 of the primary circuit of a transformer. These contacts, upon the spring 12 being compressed a definite amount, are closed, with the result that a current passes then through the electrodes placed in the electrode carriers 3 and 4. By an adjustment of the nut 14 the tension of spring 12 can be varied to correspond to a predetermined welding pressure.

If desired, the handles 6 and 8 may be covered with an insulating covering shown at 20, which, however, as a rule, will not be necessary, since the voltage in said handles will not exceed twelve volts. At 19 is shown a spring tending to spread the handles 6 and 8 apart to thereby facilitate the manipulation of the tool.

With reference to Fig. 3 of the drawings, I will now describe, how the circuit including the welding electrodes is automatically opened, when the desired welding effect has been accomplished, which is the case when the strength of the current in the primary and secondary, which during the welding operation increases, has reached a predetermined maximum value. This I accomplish by providing, for instance, in the secondary 21 a suitable relay 24 corresponding to the maximum current value.

At the end of the welding operation the strength of the current in the secondary has increased to such an extent that the magnetic action of the current will overcome the weight of the contact arm and will attract the armature. By means of a pin of an insulating material a contact spring 27' is operated thereby, which contact spring in making contact with a second contact closes the electric circuit 27 and 28 to said relay 22 and back over the transformer 33 and the contacts 17 and 18 carried by the pressure handle 7. As a result, the contact arm 32' of the relay 22 is attracted, the contact between 29 and 30 is broken and current will no longer flow through the coil of the element 34 with the result that the contact arm 31' by its spring is returned to its original position. At the same time, the contact at 31 is opened, which heretofore had held closed the main circuit, so that no current now flows through the transformer 23 and the welding electrodes carried by the holders 3 and 4. Thus, the welding operation is automatically terminated.

The contacts 27 and 28, however, are in contact with each other for a brief time only and since the contact arm 24 directly after the welding current has been disconnected returns to its original position, no current would flow through the relay 22 with the result that at 29 and 30 the contact would again be closed, whereby also the contacts 31 by the attraction of the arm 31' would be closed again with the result that the welding operation could again commence. To prevent this, however, an auxiliary contact 32 is provided, which directly after the interruption of the contacts 29 and 30 causes current to continue to flow through the coil of relay 22, until by hand the contacts 17 and 18 carried by the pressure handle 7 are likewise opened so that the tool is ready now for a fresh welding operation.

In order to insure greater safety, there is used for the operation of the contacts 17, 18, 29, 30 and 32 and the coils of the relays 22 and 34 a weak current, which I accomplish by the interposition of a small transformer 33, whereby the voltage is considerably reduced, for example, to twelve (12) volts. Only through contact 31 flows a current having a voltage of 220 volts.

In the secondary 25 and 26 the voltage for the resistance welding is only 2 to 8 volts so that all parts of the tool can be handled without any danger or risk of shocks.

The easily movable flexible current supplying cables 25 and 26 from the transformer 23 to the tool may be water-cooled by being enclosed over their entire length in a rubber hose 35, in which circulates a current of water.

It may be further noted that the transformer and the electric switch mechanism are enclosed in a casing, which, by being mounted on rollers or in a suspended position, may be readily moved from one place to another and which, especially because of the flexible and easily movable cables 25 and 26, permits the tool to be used within a large range of movements.

As shown in Fig. 5, the contacts indicated at 17' and 18' may be directly provided on the handles of the tool.

I claim:

1. A manual spot welding tool consisting of a pair of tongs comprising two jaws and handles therefor, holders for the welding electrodes detachably mounted on said jaws being insulated therefrom, a third handle operatively connected with one of said handles, a common pivot connecting all said handles, an electric contact carried each by one of said first mentioned handles and said third handle, and a compression spring intermediate said first mentioned handle and said third handle permitting said contacts to be closed only after having been compressed to a predetermined extent by the operation of said third handle.

2. A manual spot welding tool consisting of a pair of tongs comprising two jaws and handles therefor, holders for the welding electrodes detachably mounted on said jaws being insulated therefrom, a third handle, a common pivot connecting all said handles, a stud laterally extending from said third handle operatively connecting said third handle with one of said first mentioned handles, an electric current carried each by said first mentioned handle and the stud extending from said third handle, and a compression spring intermediate said first mentioned handle and said third handle and permitting the closing of said contacts only upon being compressed to a predetermined extent by the operation of said third handle.

WALTER GLADITZ.